(12) United States Patent
Akagi et al.

(10) Patent No.: US 6,755,760 B2
(45) Date of Patent: Jun. 29, 2004

(54) BELT FOR NON-STAGE TRANSMISSIONS

(75) Inventors: Hirofumi Akagi, Wako (JP); Takamichi Shimada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 59 days.

(21) Appl. No.: 09/926,170

(22) PCT Filed: Dec. 22, 2000

(86) PCT No.: PCT/JP00/09149

§ 371 (c)(1),
(2), (4) Date: Jan. 15, 2002

(87) PCT Pub. No.: WO01/53717

PCT Pub. Date: Jul. 26, 2001

(65) Prior Publication Data

US 2003/0050142 A1 Mar. 13, 2003

(30) Foreign Application Priority Data

Jan. 19, 2000 (JP) .......................................... 2000-14118

(51) Int. Cl.$^7$ ................................................. F16G 1/22
(52) U.S. Cl. ...................................... 474/242; 474/201
(58) Field of Search ................................. 474/242, 201, 474/245, 244, 237, 248

(56) References Cited

U.S. PATENT DOCUMENTS

| | | | | |
|---|---|---|---|---|
| 4,619,634 A | * | 10/1986 | Nakawaki | 474/201 |
| 4,906,225 A | * | 3/1990 | van Lith | 474/242 |
| 5,123,879 A | * | 6/1992 | Lecouturier et al. | 474/242 |
| 5,152,722 A | * | 10/1992 | Yamada | 474/240 |
| 5,169,369 A | * | 12/1992 | Masuda et al. | 474/242 |
| 5,180,345 A | * | 1/1993 | Van der Zande | 474/201 |
| 5,439,422 A | | 8/1995 | Smeets | |
| 6,440,023 B2 | * | 8/2002 | Kanehara et al. | 474/242 |
| 6,464,606 B2 | * | 10/2002 | Brandsma et al. | 474/242 |

FOREIGN PATENT DOCUMENTS

| | | | | |
|---|---|---|---|---|
| JP | 01015554 A | * | 1/1989 | ............. F16G/5/16 |
| JP | 7-12177 | | 1/1995 | |
| JP | 10331920 A | * | 12/1998 | ............. F16G/5/16 |
| JP | 2000-74149 | | 3/2000 | |
| JP | 2000-193041 | | 7/2000 | |
| WO | WO99/53219 | | 10/1999 | |

* cited by examiner

Primary Examiner—Marcus Charles
(74) Attorney, Agent, or Firm—Armstrong, Kratz, Quintos, Hanson & Brooks, LLP

(57) ABSTRACT

In a belt for a continuously variable transmission, a first clearance $CL_{NH}$ is defined between a projection and a recess formed on front and rear surfaces of a metal element, and a second clearance CLy is defined between an upper surface of a metal ring assembly and a lower ear surface of the metal element. By setting a relation, $CLY > CL_{NH}$ ensures, that when the metal element has been pitched, the projection and the recess can be first brought into contact with each other, thereby preventing a reduction in durability of the metal ring assembly. If the thickness of the metal ring assembly is represented by $T_L$, and the vertical opening of the ring slot is represented by D, when the value of $D/T_L$ exceeds 11/8, the power transmitting efficiency is reduced. Therefore, the reduction in power transmitting efficiency can be prevented while maintaining durability of metal ring assembly by setting $D/T_L$ at a smaller value than 11/8.

3 Claims, 11 Drawing Sheets

TANGENT FRICTIONAL FORCE F

TANGENT FRICTIONAL FORCE F

FIG.9B

URGING FORCE E BETWEEN METAL ELEMENTS

BELT FOR NON-STAGE TRANSMISSIONS

FIELD OF THE INVENTION

The present invention relates to a belt for a continuously variable transmission, which comprises a metal ring assembly comprising a plurality of endless metal rings laminated one on another, and a large number of metal elements each having a ring slot into which the metal ring assembly is fitted, the belt being wound around a drive pulley and a driven pulley to transmit a driving force between both of the pulleys.

BACKGROUND ART

There is an invention relating to such a belt for a continuously variable transmission, which is conventionally known from Japanese Patent Application Laid-open No.7-12177, and in which in order to inhibit the rolling of metal elements supported on a pair of metal ring assemblies to smoothly engage the metal elements in pulleys, a vertical (in a direction of thickness of the belt) clearance in each of the metal ring assemblies within a ring slot in a metal element (a difference between a groove width of the ring slot and a thickness of the metal ring assembly) is defined.

Figure 11:
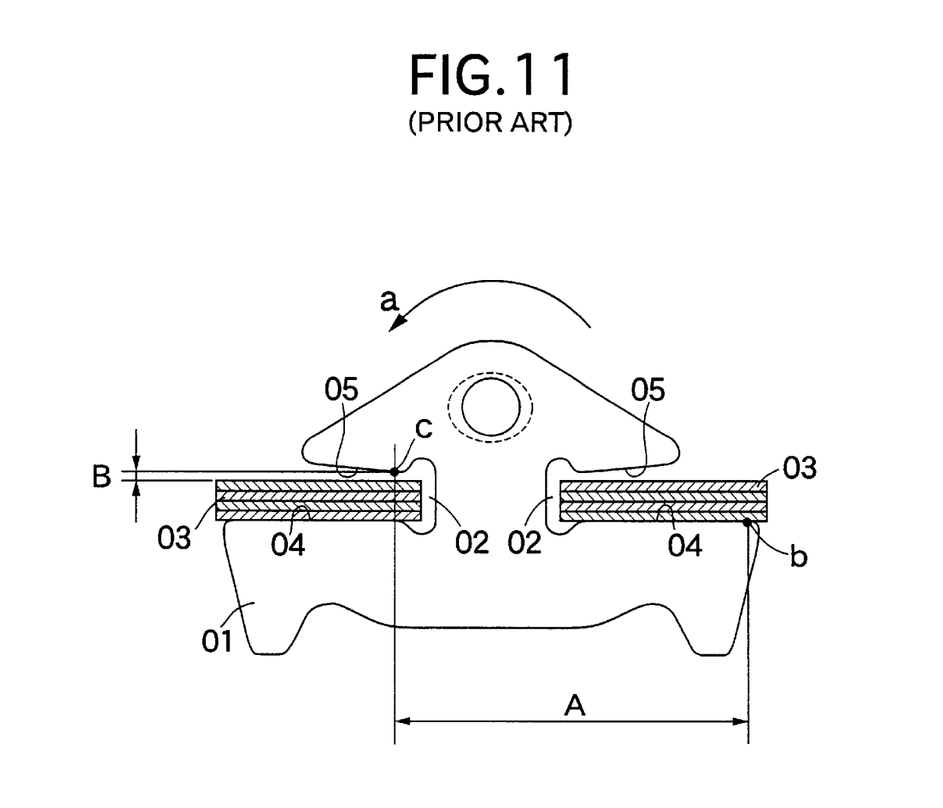
FIG. 11 is a diagram showing a cross section of a conventional metal belt.

FIG. 11 shows a cross section of the belt for the continuously variable transmission described in the above-described Japanese Patent Application Laid-open No.7-12177. In this belt, metal ring assemblies 03, 03 are engaged in a pair of left and right ring slots 02, 02 in a metal element 01. When the metal element 01 is not rolled, lower surfaces of the metal ring assemblies 03, 03 are in contact with saddle surfaces 04, 04, and a clearance B is established between upper surfaces of the metal ring assemblies 03, 03 and lower ear surfaces 05, 05. When the metal element 01 has been rolled in a direction of an arrow a in FIG. 11, the lower surface of one of the metal ring assemblies 03 is brought into contact with the saddle surface 04 at a point b, and an upper surface of the other metal ring assembly 03 is brought into contact with the lower ear surface 05 at a point c. By setting the clearance B so as to establish an expression, $\tan^{-}B/A<1°$ wherein A represents a distance between the points b and c, it can be prevented that when the metal element 01 has been rolled at least at 1°, the pair of metal ring assemblies 03, 03 are brought into contact with the saddle surface 04 and the lower ear surface 05 at the points b and c, whereby the metal element 01 is further rolled by a reaction force resulting from such contact.

Figure 3:
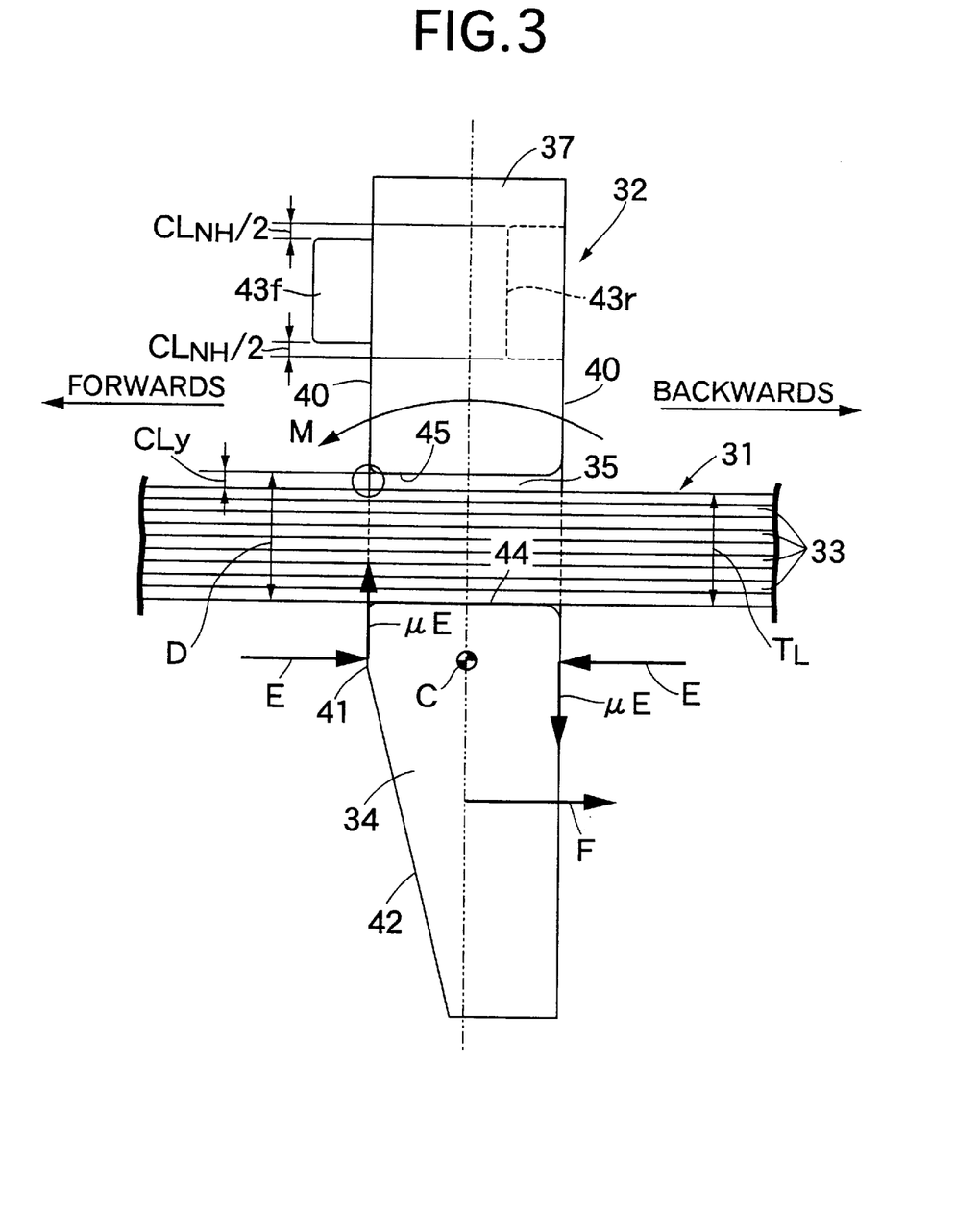
FIG. 3 is an enlarged view taken in the direction of an arrow 3 in FIG. 2.
Figure 10:
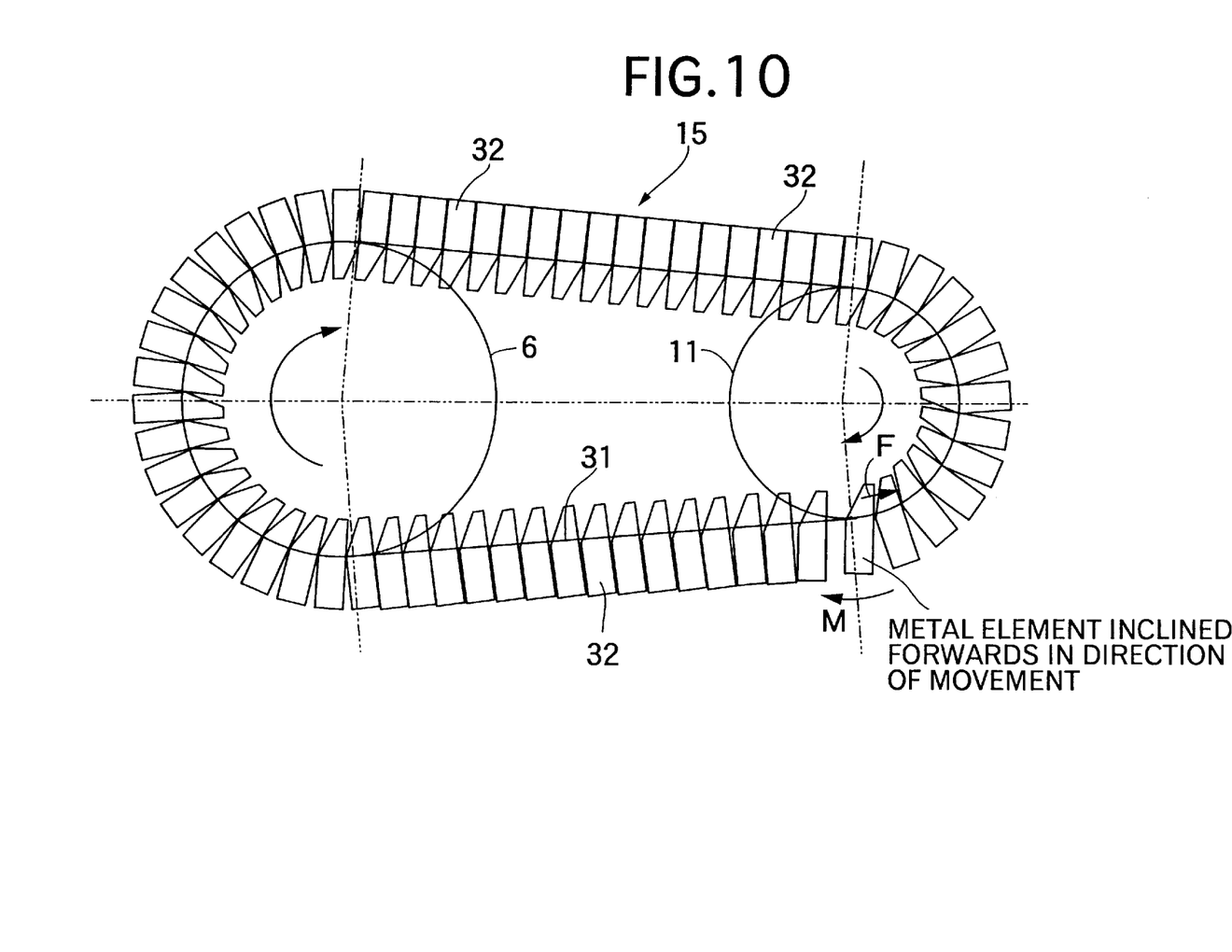
FIG. 10 is an illustration showing an inclination of the metal element in the vicinity of an exit of a driven pulley.

The belt described in the above-described Japanese Patent Application Laid-open No.7-12177 is designed, so that the rolling of the metal element is inhibited. However, it is known that the clearance between the upper surface of the metal ring assembly and the lower ear surface also exerts a large influence to the durability of the metal ring assembly, when the metal element has been pitched. More specifically, when the metal element has been pitched, an edge of the lower ear surface is brought into contact with the upper surface of the metal ring assembly to generate a stress at such contact portion, thereby reducing the durability of the metal ring assembly. The pitching of the metal element occurs in the vicinity of an exit of a driven pulley by the following reason:

When the metal element 32 supported with the ring slots 35, 35 fitted over the metal ring assemblies 31, 31 has been inclined forwards in a direction of movement, as shown in FIG. 3, the following problem is encountered: Front ends of the lower ear surfaces 45, 45 forming upper edges of the ring slots 35, 35 in the direction of movement are brought into contact with the upper surfaces of the metal ring assemblies 31, 31 (see a mark ○ in FIG. 3) and hence, a large hertz stress is generated at such contact portion to exert an adverse influence to the durability of the metal ring assemblies 31, 31. The forward inclination of the metal element 32 in the direction of movement is generated by a tangent frictional force F received by the metal element 32 at its surface of contact with the pulley and by an urging force E between the metal elements 32. Such a tendency is particularly remarkable at an exit area of the driven pulley (see FIG. 10). The reason will be described below.

In FIG. 3, a moment generated in the direction of an arrow M by the tangent frictional force F acts to bring down the metal element 32 forwards in the direction of movement about the swinging center C. On the other hand, a radial (vertical) frictional force $\mu E$ generated by the urging force E between the metal elements 32 generates a moment in the direction opposite from the arrow M in the metal element 32 and acts to bring down the metal element 32 backwards in the direction of movement about the swinging center C.

Figure 9A:
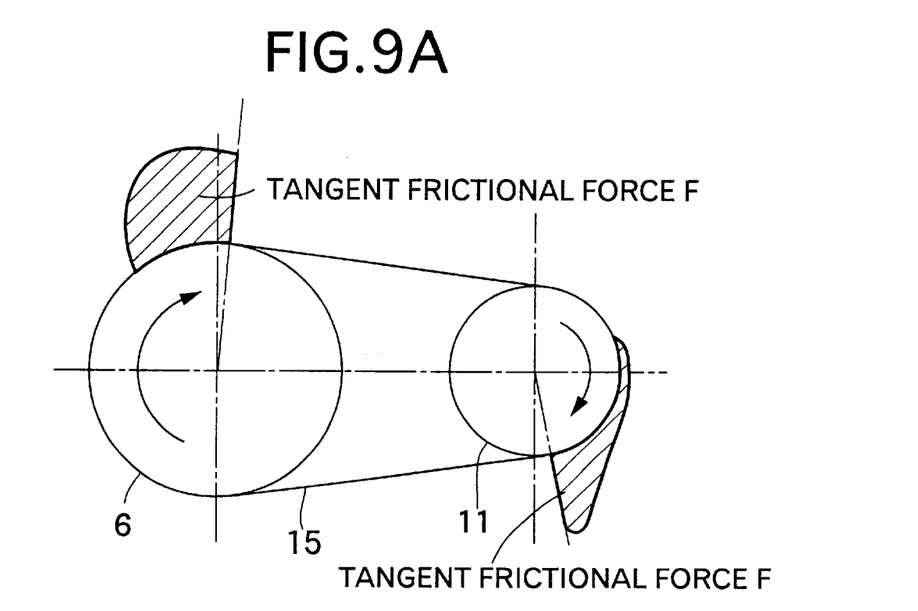
FIGS. 9A and 9B are diagrams each showing distributions of a tangent frictional force F received by the metal element from a pulley and an urging force E between the metal elements.
Figure 9B:
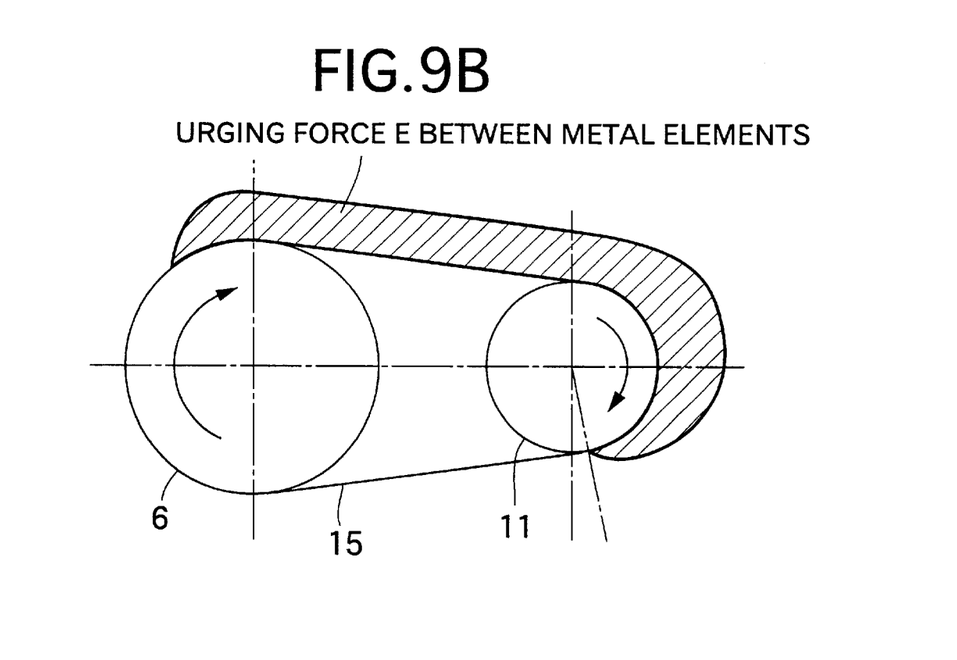

It is known that the tangent frictional force F received by the metal element 32 from the drive pulley 6 or the driven pulley 11 is large in the exit area of the drive pulley 6 or the driven pulley 11, as shown in FIG. 9A, and the value of such tangent frictional force F reaches four times a value provided when it is supposed that the tangent frictional force F has been averagely distributed over the entire winding region of the pulley 6 or 11, by reason that the pulley 6 or 11 is deformed, resulting in an axial thrust concentrated thereon, or by another reason. In addition, as shown in FIG. 9B, the urging force E between the metal elements 32 has a large value in the exit area of the drive pulley 6, but assumes zero in the exit area of the driven pulley 11. Therefore, the metal element 32 is most liable to be inclined forwards in the direction of movement in a position where the tangent frictional force F acting to incline the metal element 32 forwards in the direction of movement assumes a maximum value and the urging force E acting to inhibit the forward inclination of the metal element 32 in the direction of movement assumes zero, i.e., in the exit area of the driven pulley 11.

DISCLOSURE OF THE INVENTION

The present invention has been accomplished with the above circumstances in view, and it is an object of the present invention to ensure a power transmitting efficiency, while preventing a reduction in durability of the metal ring assembly due to the pitching of the metal element.

To achieve the above object, according to the present invention, there is provided a belt for a continuously variable transmission, which comprises a metal ring assembly comprising a plurality of endless metal rings laminated one on another, and a large number of metal elements each having a ring slot into which the metal ring assembly is fitted, the belt being wound around a drive pulley and a driven pulley to transmit a driving force between both of the pulleys, each of the metal elements having a projection and a recess provided on front and rear surfaces thereof for engaging with preceding and succeeding ones of the metal elements, respectively, characterized in that when the size of a first vertical clearance between the projection and the recess of the metal element is represented by $CL_{NH}$; the size of a second vertical clearance in the metal ring assembly within the ring slot is represented by $CLy$; a thickness of the metal ring assembly is represented by $T_L$; and a vertical opening of the ring slot is represented by D, the following expression is established:

$$(CL_{NH}/T_L)+1<D/T_L<(0.86\ mm/T_L)+1$$

With the above arrangement, the second vertical clearance CLy in the metal ring assembly within the ring slot is sized to be larger than the first vertical clearance $CL_{NH}$ between the projection and the recess of the metal element. Therefore, when the metal element has been pitched, the first clearance $CL_{NH}$ is first distinguished, whereby a further increase in pitch angle is inhibited, and the second clearance CLy is prevented from being distinguished. As a result, the upper surface of the metal ring assembly is prevented from being brought into contact with an upper edge of the ring slot to avoid a reduction in durability of the metal ring assembly.

When $D/T_L$ exceeds $(0.86\ mm/T_L)+1$, the power transmitting efficiency is reduced and hence, a reduction in power transmitting efficiency can be prevented by setting $D/T_L$ at a smaller value than $(0.86\ mm/T_L)+1$.

There is provided a belt for a continuously variable transmission, in addition to the above arrangement, wherein an expression, $1<D/T_L<11/8$ is established.

With the above arrangement, a reduction in power transmitting efficiency can be prevented, while avoiding a reduction in durability of the metal ring assembly by setting the ratio $D/T_L$, so that the expression, $1<D/T_L<11/8$ is established in a common metal belt having a width of about 24 mm.

BRIEF DESCRIPTION OF THE DRAWINGS

FIGS. 1 to 10 show an embodiment of the present invention.

BEST MODE FOR CARRYING OUT THE INVENTION

A mode for carrying out the present invention will now be described with reference to an embodiment of the invention shown in the accompanying drawings.

FIGS. 1 to 10 show an embodiment of the present invention.

Figure 2:
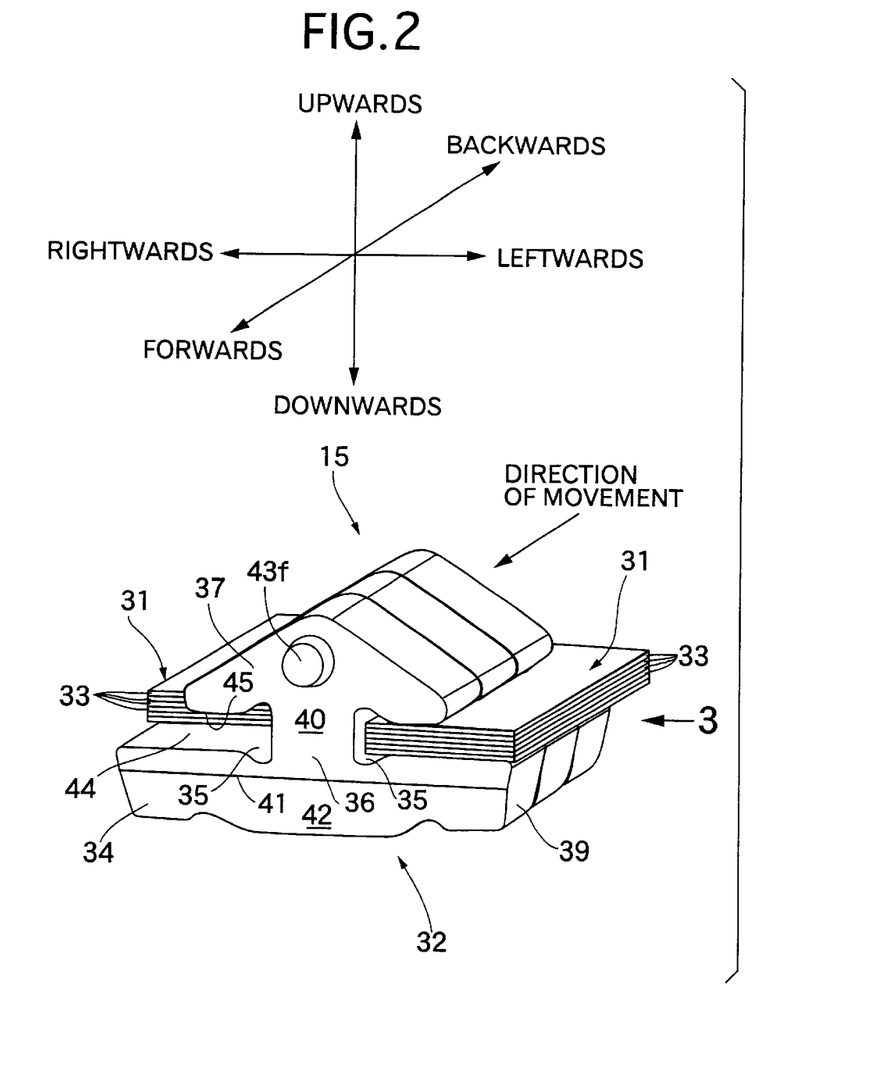
FIG. 2 is a partial perspective view of a metal belt.

Incidentally, the definition of forward and rearward directions, a lateral direction and a vertical direction of a metal element used in the embodiment is shown in FIG. 2.

Figure 1:
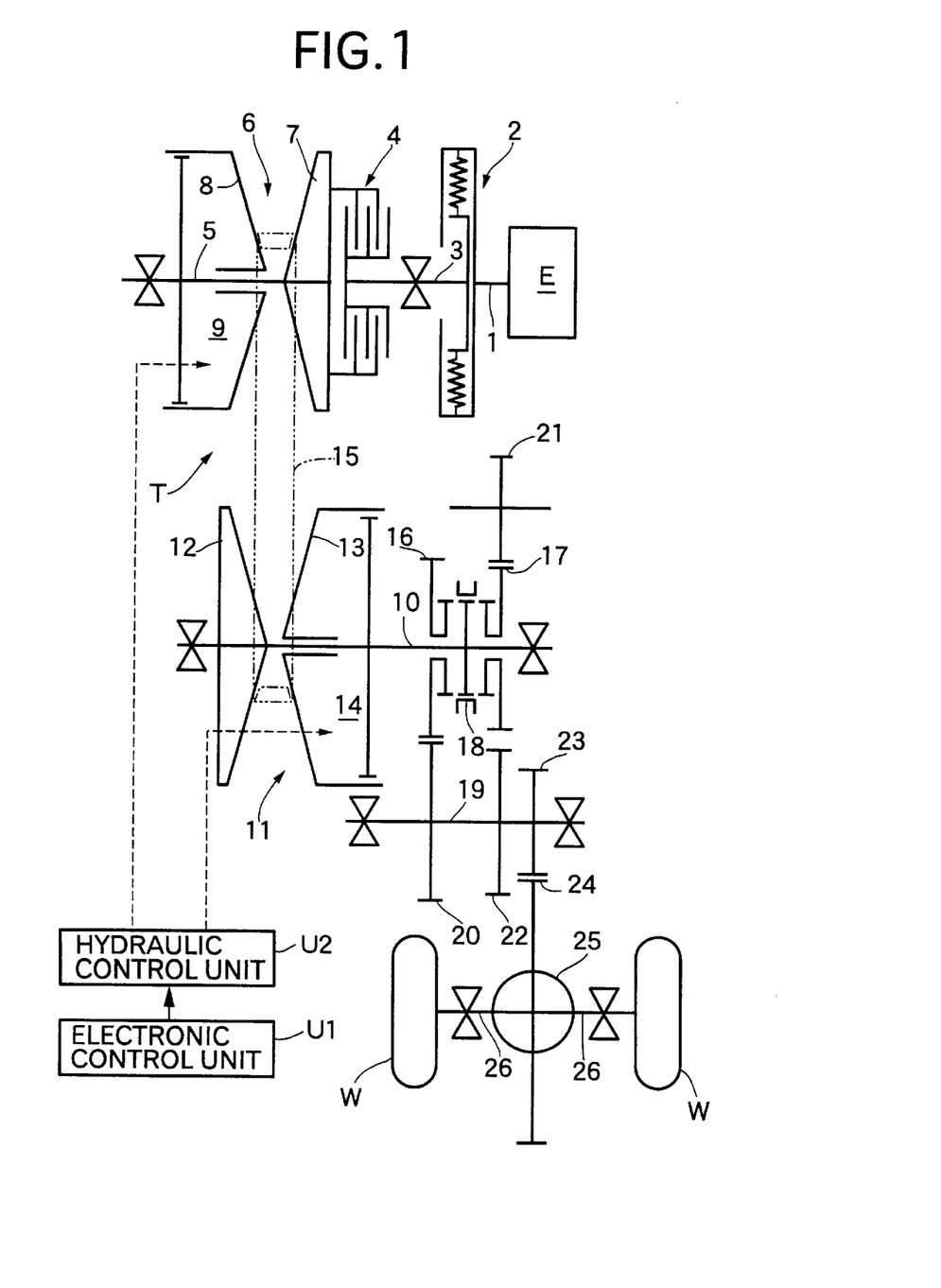
FIG. 1 is a skeleton illustration of a power transmitting system in a vehicle having a continuously variable transmission mounted thereon.

FIG. 1 schematically shows the structure of a metal belt type continuous variable transmission T mounted in an automobile. An input shaft 3 connected to a crankshaft 1 of an engine E through a damper 2 is connected to a drive shaft 5 of the metal belt type continuous variable, transmission T through a start clutch 4. A drive pulley 6 provided on the drive shaft 5 includes a stationary pulley half 7 secured to the drive shaft 5, and a movable pulley half 8 which can be moved toward and away from the stationary pulley half 7. The movable pulley half 8 is biased toward the stationary pulley half 7 by a hydraulic pressure applied to an oil chamber 9.

A driven pulley 11 is provided on a driven shaft 10 disposed in parallel to the drive shaft 5, and includes a stationary pulley half 12 secured to the driven shaft 10, and a movable pulley half 13 which can be moved toward and away from the stationary pulley half 12. The movable pulley half 13 is biased toward the stationary pulley half 12 by a hydraulic pressure applied to an oil chamber 14. A metal belt 15 is wound around the drive pulley 6 and the driven pulley 11. The metal belt 15 comprises a large number of metal elements 32 supported on a pair of left and right metal ring assemblies 31, 31 (see FIG. 2). Each of the metal ring assemblies 31 comprises twelve metal rings 33 which are laminated on one another.

A forward drive gear 16 and a backward drive gear 17 are relatively rotatably supported on the driven shaft 10. The forward and backward drive gears 16 and 17 can be coupled selectively to the driven shaft 10 by a selector 18. A forward driven gear 20 meshed with the forward drive gear 16 and a backward driven gear 22 meshed with the backward drive gear 17 through a backward idling gear 21 are secured to an output shaft 19 which is disposed in parallel to the driven shaft 10.

The revolution or rotation of the output shaft 19 is input to a differential 25 through a final drive gear 23 and a final driven gear 24, and is transmitted therefrom through left and right axles 26, 26 to driven wheels W, W.

A driving force of the engine E is transmitted to the driven shaft 10 through the crankshaft 1, the damper 2, the input shaft 3, the start clutch 4, the drive shaft 5, the drive pulley 6, the metal belt 15 and the driven pulley 11. When a forward travel range is selected, the driving force of the driven shaft 10 is transmitted to the output shaft 19 through the forward drive gear 16 and the forward driven gear 20, thereby allowing the vehicle to travel forwards. When a backward travel range is selected, the driving force of the driven shaft 10 is transmitted to the output shaft 19 through the backward drive gear 17, the backward idling gear 21 and the backward driven gear 22, thereby allowing the vehicle to travel backwards.

At that time, hydraulic pressures applied to the oil chamber 9 of the drive pulley 6 and the oil chamber 14 of the driven pulley 11 of the metal belt type continuous variable transmission T are controlled by a hydraulic control unit $U_2$ which is operated by a command from an electronic control unit $U_1$, thereby adjusting the change gear ratio continuously or in a stepless manner. More specifically, if a hydraulic pressure applied to the oil chamber 14 of the driven pulley 11 is increased relative to a hydraulic pressure applied to the oil chamber 9 of the drive pulley 6, the grove width of the driven pulley 11 is reduced, leading to an increased effective radius, and correspondingly, the groove width of the drive pulley 6 is increased, leading to a reduced effective radius. Therefore, the change gear ratio of the metal belt type continuous variable transmission T is varied toward "LOW" continuously or in the stepless manner. On the other hand, if the hydraulic pressure applied to the oil chamber 9 of the drive pulley 6 is increased relative to the hydraulic pressure applied to the oil chamber 14 of the driven pulley 11, the groove width of the drive pulley 6 is reduced, leading to an increased effective radius, and correspondingly, the groove width of the driven pulley 11 is increased, leading to a reduced effective radius. Therefore, the change gear ratio of the metal belt type continuous variable transmission T is varied toward "OD" continuously or in the stepless manner.

As shown in FIGS. 2 and 3, each of the metal elements 32 which is formed from a metal plate material by punching or stamping includes a substantially trapezoidal element body 34, a neck 36 located between a pair of left and right ring slots 35, 35 into which the metal ring assemblies 31, 31 are fitted, and a substantially triangular ear 37 connected to an upper portion of the element body 34 through the neck 36. The element body 34 is formed at its laterally opposite ends with a pair of pulley abutment faces 39, 39 capable of abutting against V-faces of the drive pulley 6 and the driven pulley 11. The metal element 32 is formed, at its front and rear portions in the direction of movement, with a pair of front and rear main surfaces 40, 40 which are perpendicular to the direction of movement and parallel to each other. An inclined surface 42 is formed below the front main surface 40 in the direction of movement with a laterally extending rocking edge 41 located therebetween. Further, the ear 37 is formed, at its front and rear surfaces, with a projection 43f and a recess 43r to connect the metal elements 32, 32 adjacent to each other in the forward and backward directions. Lower edges and upper edges of the ring slots 35, 35 are referred to as called saddle surfaces 44, 44 and lower ear surfaces 45, 45, respectively. Lower surfaces of the metal ring assemblies 31, 31 are in abutment against the saddle surfaces 44, 44, and upper surfaces of the metal ring assemblies 31, 31 are opposed to the lower ear surfaces 45, 45.

As can be seen from FIG. 3, the diameter of the projection 43f formed at the front surface of the metal element 32 is set smaller than that of the recess 43r formed in the rear surface, and a first clearance $CL_{NH}$ is defined between the projection 43f and the recess 43r. The projection 43f and recess 43r have cross sections circular about the same axis and hence, a clearance between an outer peripheral surface of the projection 43f and an inner peripheral surface of the recess 43r is sized to be equal to $CL_{NH}/2$. On the other hand, a second clearance CLy is defined between the upper surface of each of the metal ring assemblies 31, 31 and each of the lower ear surfaces 45, 45 of the metal element 32, and is sized to correspond to a difference between the groove width of each of the ring slots 35, 35 and the thickness of each of the metal ring assemblies 31, 31. The thickness of the metal ring assembly 31 is represented by $T_L$, and a vertical opening of each of the ring slots 35, 35 is represented by D.

Figure 4A:
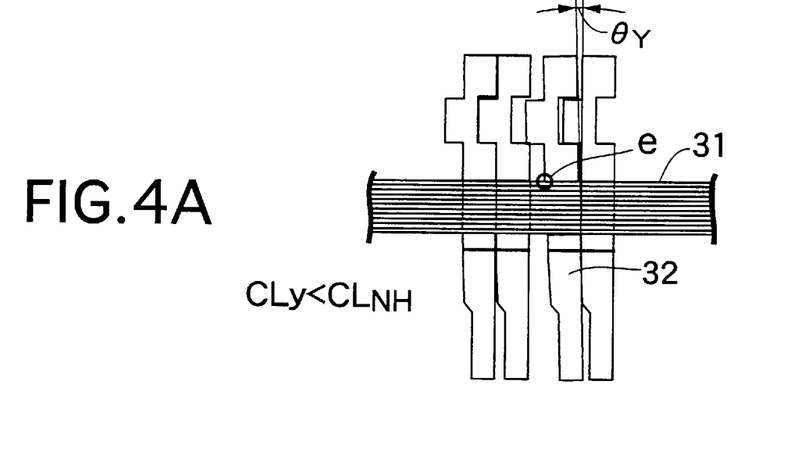
FIGS. 4A, 4B and 4C are diagrams for explaining the operation when the metal element has been pitched.
Figure 4B:
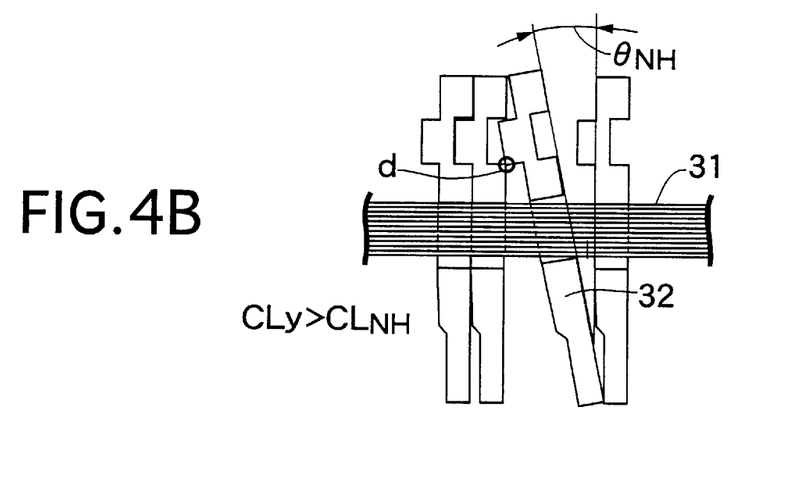
Figure 4C:
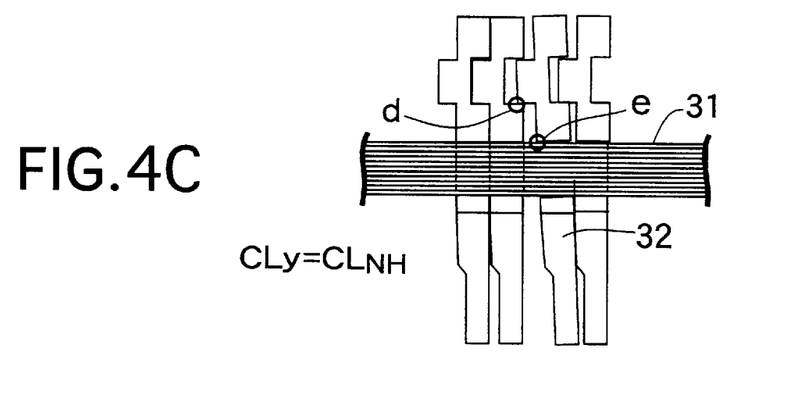

FIG. 4C shows the metal elements 32 with CLy set at a value equal to $CL_{NH}$ in a state in which the metal element 32 has been pitched forward relative to the preceding metal element 32. In this case, when the pitch angle of the metal element 32 is increased, the first clearance $CL_{NH}$ is decreased, whereby the recess 43r of the preceding metal element 32 and the projection 43f of the succeeding metal element 32 are brought into contact with each other at a point d and at the same time, the second clearance CLy is decreased, whereby the upper surface of the metal ring assembly 31 and the lower ear surface 45 of the metal element 32 are brought into contact with each other at a point e. Therefore, if a relation, $CLy<CL_{NH}$ is established, as shown in FIG. 4A, the upper surface of the metal ring assembly 31 and the lower ear surface 45 of the metal element 32 are brought into contact with each other at the point e earlier than at the point d with an increase of the pitch angle of the metal element 32. The pitch angle of the metal element 32 at that time is defined as θy. On the other hand, if a relation, $CLy>CL_{NH}$, as shown in FIG. 4B, the projection 43f and the recess 43r of the metal element 32 are brought into contact with each other at the point d earlier than at the point e with an increase of the pitch angle of the metal element 32. The pitch angle of the metal element 32 at that time is defined as $θ_{NH}$.

Figure 5:
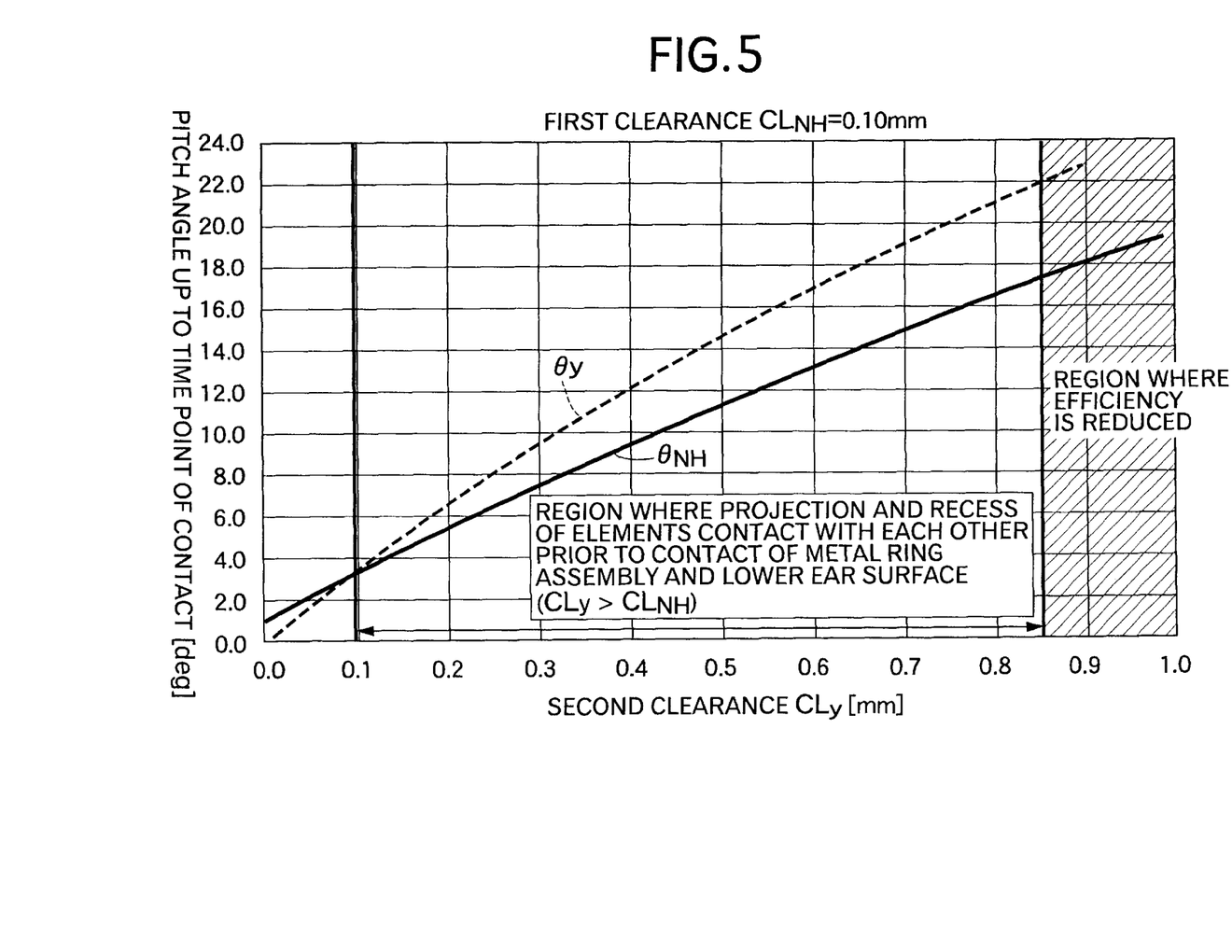
FIG. 5 is a graph showing variations in pitch angles $\theta_{NH}$ and θy up to a time point of contact of the metal elements with each other with respect to a variation in second clearance CLy (when the size of a first clearance $CL_{NH}$ is equal to 0.10 mm)

FIG. 5 shows how the pitch angles θy and $θ_{NH}$ are varied when the size of the second clearance CLy is varied with the size of the first clearance $CL_{NH}$ fixed at 0.10 mm. A relation, $θ_{NH}>θy$ is maintained, until the size of the second clearance CLy reaches 0.10 mm equal to the size of the first clearance $CL_{NH}$; and the actual pitch angle of the metal element 32 is limited by θy. Namely, the actual pitch angle of the metal element 32 is limited by the contact of the upper surface of the metal ring assembly 31 and the lower ear surface 45 of the metal element 32 with each other. On the other hand, when the size of the second clearance CLy exceeds 0.10 mm equal to the size of the first clearance $CL_{NH}$, a relation, $θy>θ_{NH}$ is established, and the actual pitch angle θ of the metal element 32 is limited by $θ_{NH}$. Namely, the actual pitch angle θ of the metal element 32 is limited by the contact of the projection 43f and the recess 43r of the preceding and succeeding metal elements 32 with each other. Therefore, by establishing the relation, $θy>θ_{NH}$, the projection 43f and the recess 43r of the preceding and succeeding metal elements 32 can be first brought into contact with each other, and the upper surface of the metal ring assembly 31 and the lower ear surface 45 of the metal element 32 can be prevented from being brought into contact with each other.

Figure 6:
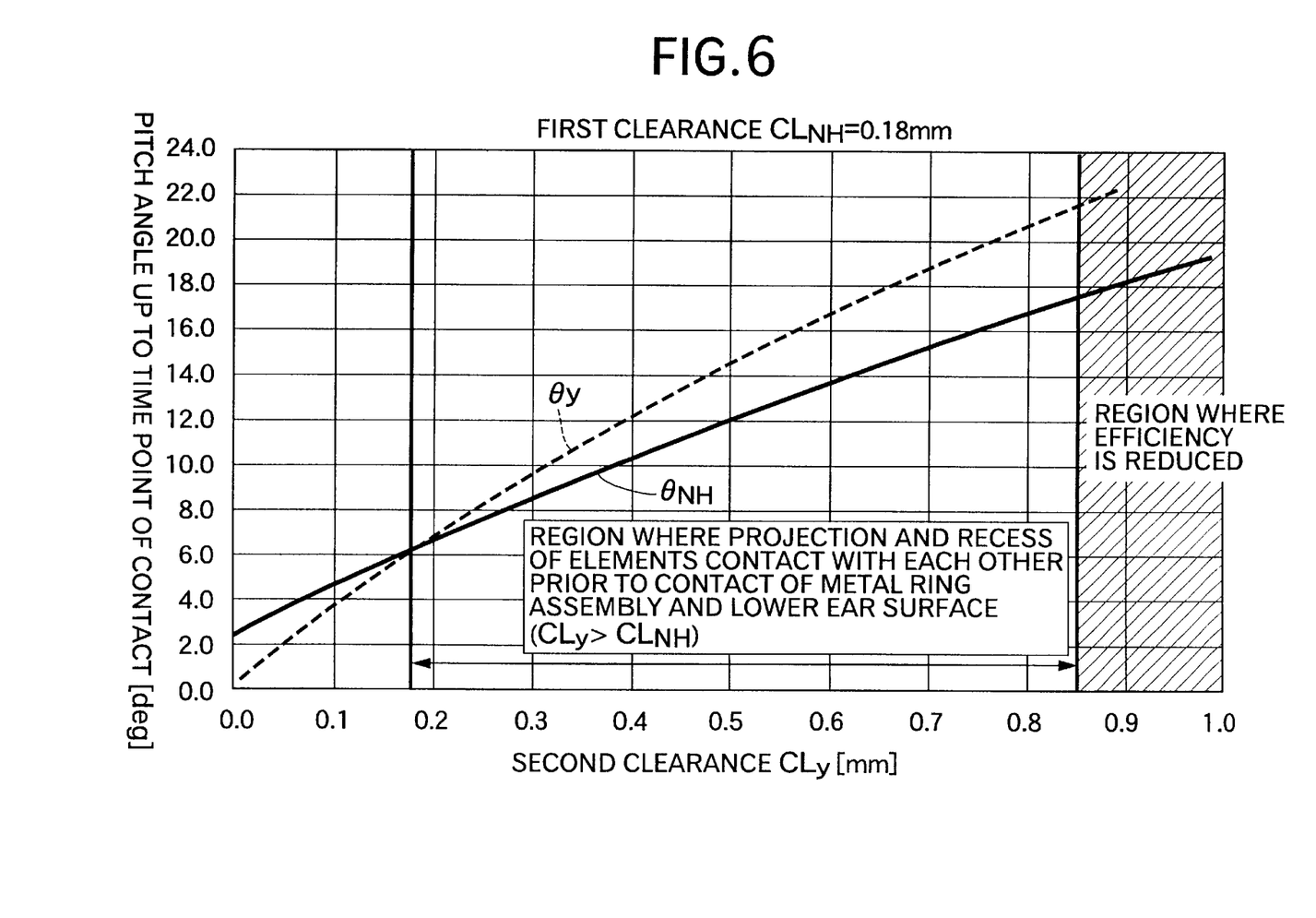
FIG. 6 is a graph showing variations in pitch angles $\theta_{NH}$ and θy up to the time point of contact of the metal elements with each other with respect to a variation in second clearance CLy (when the size of the first clearance $CL_{NH}$ is equal to 0.18 mm)

FIG. 6 shows how the pitch angles θy and $θ_{NH}$ are varied when the size of the second clearance CLy is varied with the size of the first clearance $CL_{NH}$ fixed at 0.18 mm. Even in this case, when the size of the second clearance CLy exceeds 0.18 mm equal to the size of the first clearance $CL_{NH}$, the relation, $θy>θ_{NH}$ is established. Thus, the projection 43f and the recess 43r of the preceding and succeeding metal elements 32 can be first brought into contact with each other, and the upper surface of the metal ring assembly 31 and the lower ear surface 45 of the metal element 32 can be prevented from being brought into contact with each other.

Figure 7A:
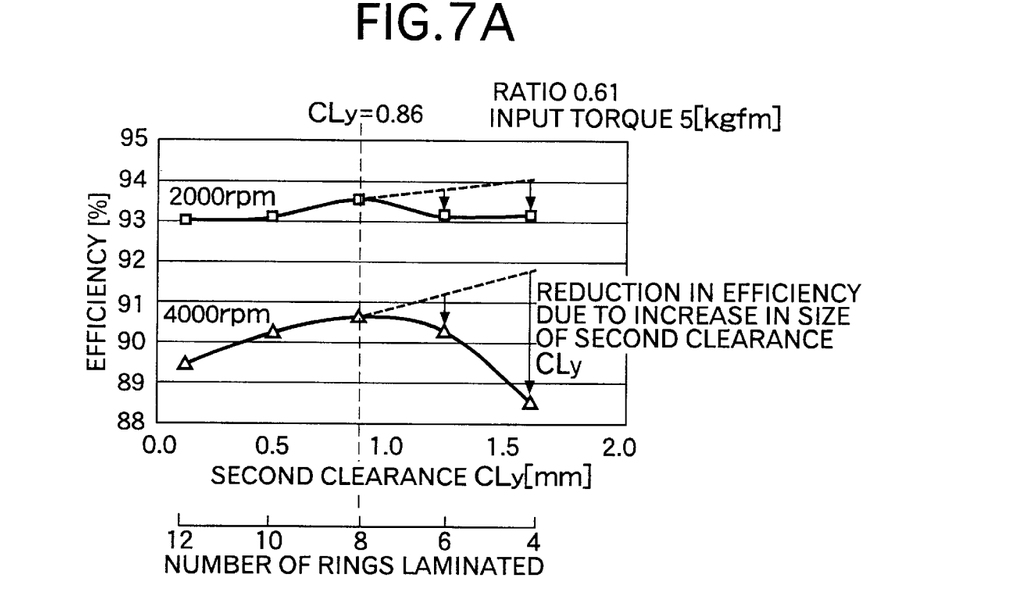
FIGS. 7A and 7B are graphs each showing a variation in power transmitting efficiency with respect to a variation in size of the second clearance CLy (when the number of metal rings has been varied)
Figure 7B:
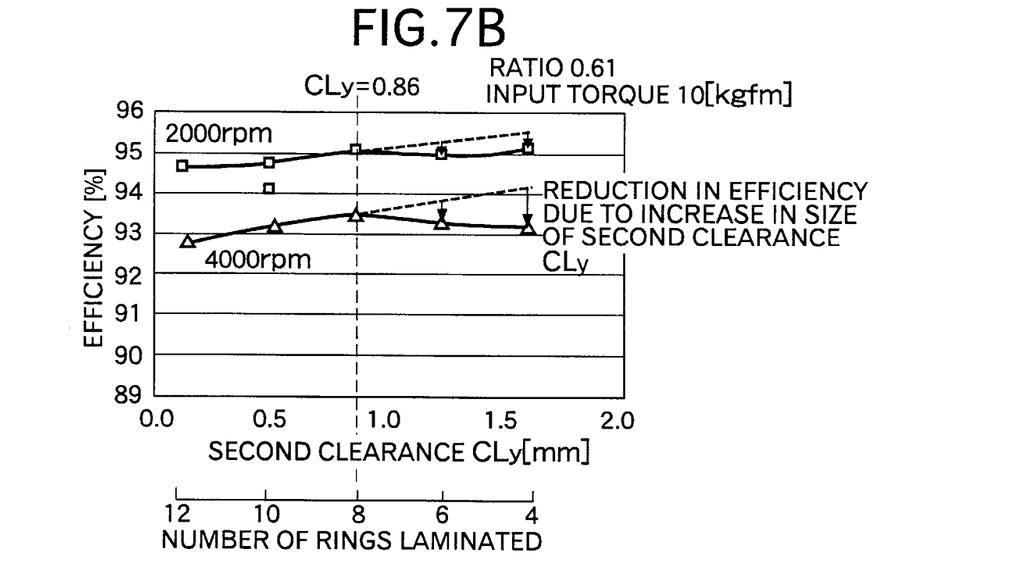

FIGS. 7A and 7B show results provided by measuring a variation in power transmitting efficiency, while decreasing the number of the metal rings 33 of the metal ring assembly 31 one by one from twelve and gradually increasing the size of the second clearance CLy. FIG. 7A corresponds to a case where the metal belt type continuously variable transmission T has been operated with a ratio of 0.61, an input torque of 5 kgfm, and input rotational speeds of 2,000 rpm and 4,000 rpm, and FIG. 7B corresponds to a case where the metal belt type continuously variable transmission T has been operated with a ratio of 0.61, an input torque of 10 kgfm, and input rotational speeds of 2,000 rpm and 4,000 rpm.

As is apparent from FIGS. 7A and 7B, as the number of the metal rings 33 of the metal ring assembly 31 is decreased from twelve, the power transmitting efficiency is increased, and when the number of the metal rings 33 is eight, the power transmitting efficiency reaches a maximum value. Thereafter, the power transmitting efficiency is decreased. Namely, it can be seen that when the number of the metal rings 33 is eight, i.e., when the size of the second clearance CLy between the upper surface of the metal ring assembly 31 and the lower ear surface 45 is 0.86 mm, the power transmitting efficiency assumes the maximum value.

If the following expression (1) is established as described above, the power transmitting efficiency can be maintained at a high value, while preventing the upper surface of the metal ring assembly 31 and the lower ear surface 45 of the metal element 32 from being brought into contact with each other.

$$CL_{NH} < CLy < 0.86 \text{ mm} \tag{1}$$

If sides of the above expression (1) are divided by the thickness T of one metal ring 33, the following expression is provided:

$$CL_{NH}/T < CLy/T < 0.86 \text{ mm} \tag{2}$$

When the metal ring assembly 31 is an assembly comprising an n number of metal rings 33 laminated one on another, $n \times T = T_L$ (thickness of the metal ring assembly 31) and hence, the expression (2) is replaced by the following expression:

$$n \times CL_{NH}/T_L / n \times CLy/T_L / n \times 0.86 \text{ mm}/T_L \tag{3}$$

Here, $CLy = D - T_L$ and hence, the expression (3) is replaced by the following expression:

$$n \times CL_{NH}/T_L / n \times (D - T_L)T_L / n \times 0.86 \text{ mm}/T_L \tag{4}$$

If sides of the expression (4) are divided by n, the following expression is provided:

$$CL_{NH}/T_L < D/T_L - 1 < 0.86 \text{ mm}/T_L \tag{5}$$

If 1 is added to sides of the expression (5), the following expression is provided:

$$(CL_{HN}/T_L) + 1 < D/T_L < (0.86 \text{ mm}/T_L) + 1 \tag{6}$$

Namely, if a range of D/TL is determined to satisfy the expression (6), the power transmitting efficiency can be maintained at a high value, while preventing the upper surface of the metal ring assembly 31 and the lower ear surface 45 of the metal element 32 from being brought into contact with each other.

In a common metal belt 15 having a width of 24 mm, $CL_{NH} \approx 0.1$ mm and hence, the maximum value of the thickness TL of a metal ring assembly 31 comprising twelve metal rings laminated one on another, if a tolerance is 0.006 mm, is represented by the following equation:

$$T_L = 0.1 \times 12 + 0.006 \times 12 = 2.292 \text{ (mm)} \tag{7}$$

If a value of $CL_{NH}/T_L$ is calculated, it can be approximated by $$CL_{NH}/T_L = 0.1 \div 2.292 \text{ mm} \approx 0 \tag{8}$$

If a value of $0.86/T_L$ is calculated, it can be approximated by $$0.86 \text{ mm}/T_L = 0.86 \text{ mm} \div 2.292 \text{ mm} \tag{9}$$

Therefore, the expression (6) is replaced by $$1 < D/T_L < 11/8 \tag{10}$$

Namely, in the common metal belt 15 having the width of 24 mm, if the value of $D/T_L$ is in a range represented by the expression (10), the power transmitting efficiency can be maintained at a high value, while preventing the upper surface of the metal ring assembly 31 and the lower ear surface 45 of the metal element 32 from being brought into contact with each other.

Figure 8A:
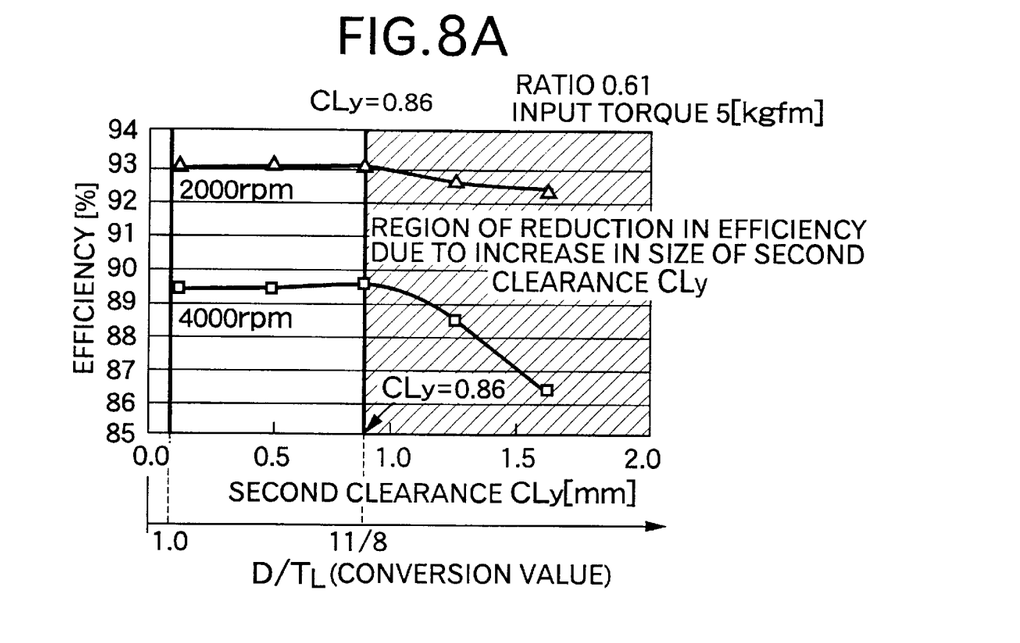
FIGS. 8A and 8B are graphs each showing a variation in power transmitting efficiency with respect to a variation in size of the second clearance CLy (when the number of metal rings has been fixed at twelve and further, a range of $D/T_L$ has been calculated from the size of CLy)
Figure 8B:
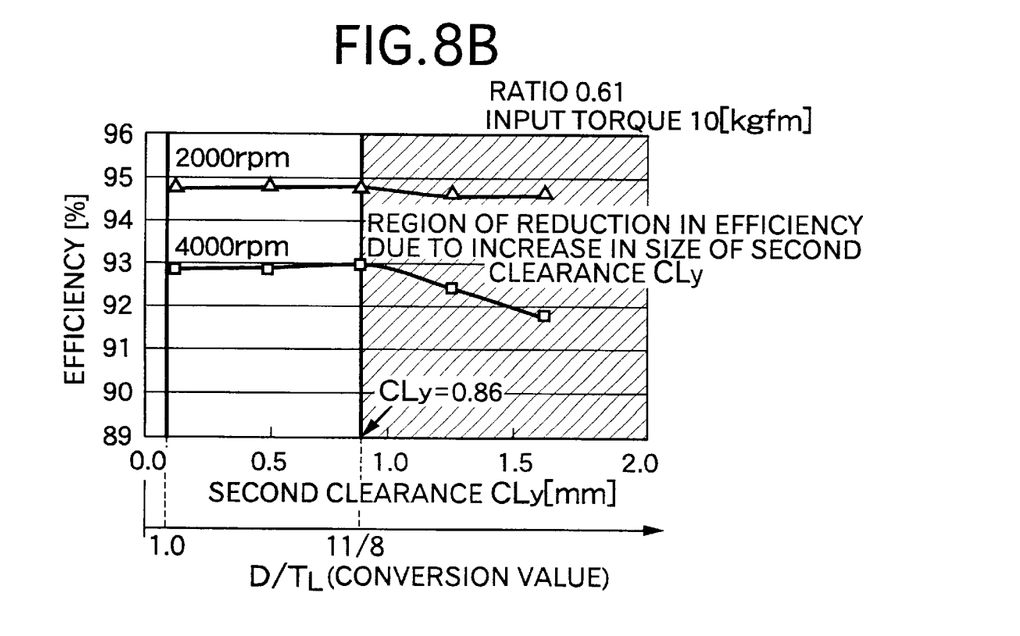

FIGS. 8A and 8B show results provided by simulating a variation in power transmitting efficiency provided when the size of the second clearance CLy has been increased with the number of the metal rings 33 of the metal ring assembly 31 being maintained at 12, based on FIGS. 7A and 7B, and further calculating a range of $D/T_L$ from the size of the second clearance CLy using the above expression. FIG. 8A corresponds to a case where the metal belt type continuously variable transmission T has been operated with a ratio of 0.61, an input torque of 5 kgfm and input rotational speeds of 2,000 rpm and 4,000 rpm, and FIG. 8B corresponds to a case where the metal belt type continuously variable transmission T has been operated with a ratio of 0.61, an input torque of 10 kgfm and input rotational speeds of 2,000 rpm and 4,000 rpm.

As is apparent from FIGS. 8A and 8B, when the value of $D/T_L$ is from 1.0 to 11/8, the power transmitting efficiency is maintained substantially constant, but when the value of $D/T_L$ is equal to or larger 11/8, the power transmitting efficiency is decreased. Therefore, the power transmitting efficiency can be prevented from being decreased, by maintaining the value of $D/T_L$ smaller than 11/8.

In general, when the thickness of the metal element 32 is 1.5 mm, the projection 43f and the recess 43r are set at a height within a range of 0.8 mm to 0.9 mm (a direction of thickness). Therefore, to prevent the pitching of the metal element 32 in a chord section, it is desirable that the size value of the second clearance CLy is equal to or smaller than such range, and the result of this test satisfies this condition.

It is possible to prevent the upper surfaces of the metal ring assembles 31, 31 from being brought into contact with the lower ear surfaces 45, 45 to reduce the durability by setting the size of the second clearance CLy larger than the size of the first clearance $CL_{NH}$, as described above. In addition, it is possible to prevent the power transmitting efficiency of the metal belt 15 from being reduced by setting the size of the second clearance CLy smaller than 0.86 mm: Specifically, when the thickness Of the metal ring assembly 31 is represented by $T_L$, and the vertical opening of each of the ring slots 35, 35 is represented by D, it is desirable that the values of D and $T_L$ are set in a range represented by $$(CL_{NH}/T_L) + 1 < D/T_L < (0.86 \text{ mm}/T_L) + 1$$

Particularly, in the metal belt 15 having the width of 24 mm, it is desirable that the values of D and $T_L$ are set in a range represented by $$1 < D/T_L < (11/8)$$

Although the embodiment of the present invention has been described in detail, it will be understood that various modifications in design may be made without departing from the subject matter of the invention defined by the claims.

INDUSRTIAL APPLICABILITY

As discussed above, the belt for the continuously variable transmission according to the present invention can be suitably used in a belt-type continuously variable transmission for an automobile, but can be also used in a belt-type continuously variable transmission in an application other than the automobile.

What is claimed is:

1. A belt for a continuously variable transmission, which comprises a metal ring assembly comprising a plurality of endless metal rings laminated one on another, and a large number of metal elements each having a ring slot into which the metal ring assembly is fitted, said belt being wound around a drive pulley and a driven pulley to transmit a driving force between both of the pulleys, each of the metal elements having a projection and a recess provided on front and rear surfaces thereof for engaging with preceding and succeeding ones of the metal elements, respectively, wherein when the size of a first vertical clearance between the projection and the recess of the metal element is represented by $CL_{NH}$; a thickness of the metal ring assembly is represented by $T_L$; and a vertical opening of the ring slot is represented by D, the following expression is established:

$$(CL_{NH}/T_L)+1 < D/T_L < (0.86 \text{ } mm/T_L)+1.$$

2. A belt for a continuously variable transmission according to claim 1, wherein an expression, $1 < D/T_L < 11/8$ is established.

3. A belt for a continuously variable transmission according to claim 1 wherein the projection and the recess of the metal element are disposed in vertically spaced relation with respect to the ring slot.

* * * * *